United States Patent [19]

Gaines et al.

[11] Patent Number: 4,549,504
[45] Date of Patent: Oct. 29, 1985

[54] ELECTRONIC CONTROLLER FOR REGULATING TEMPERATURE WITHIN AN INTERNAL COMBUSTION ENGINE SYSTEM

[75] Inventors: Donald R. Gaines, Farmington Hills; Donald L. Gaines, Northville, both of Mich.

[73] Assignee: Evans Products Company, Coldwater, Mich.

[21] Appl. No.: 632,607

[22] Filed: Jul. 19, 1984

[51] Int. Cl.⁴ .............................................. F01P 11/16
[52] U.S. Cl. .................... 123/41.01; 123/41.15; 364/557
[58] Field of Search ............... 123/41.15, 41.05, 41.01, 123/198 D; 364/5.7

[56] References Cited

U.S. PATENT DOCUMENTS

| | | | |
|---|---|---|---|
| Re. 27,108 | 3/1971 | Johnson, Jr. et al. | 123/198 |
| 2,291,283 | 7/1942 | Klein et al. | 236/35 |
| 2,403,917 | 7/1946 | Gille | 236/1 |
| 2,476,406 | 7/1949 | Dilworth | 123/41.15 |
| 2,539,089 | 1/1951 | Lear | 236/78 |
| 2,840,316 | 6/1958 | Herbenar | 236/35 |
| 3,533,391 | 10/1970 | Lockmuller | 123/41.15 |
| 3,568,648 | 3/1971 | Cass | 123/41.15 |
| 3,759,054 | 9/1973 | Graber | 62/183 |
| 3,775,745 | 11/1973 | Kelley | 123/41.15 |
| 3,841,291 | 10/1974 | Ludewig et al. | 123/41.15 |
| 3,853,098 | 12/1974 | Ishikawa et al. | 123/41.11 |
| 3,894,521 | 7/1975 | Sakasegawa et al. | 123/41.12 |
| 3,964,444 | 6/1976 | Hemmann et al. | 123/41.49 |
| 4,019,489 | 4/1977 | Cartmill | 123/41.15 |
| 4,020,818 | 5/1977 | Lesnick et al. | 123/41.15 |
| 4,044,287 | 8/1977 | Ratzel et al. | 318/432 |
| 4,065,052 | 12/1977 | Ridenour | 123/41.12 |
| 4,078,531 | 3/1978 | Hewitt | 123/41.15 |
| 4,106,470 | 8/1978 | Saizar | 123/41.15 |
| 4,124,001 | 11/1978 | Samuel et al. | 123/41.12 |
| 4,133,185 | 1/1979 | Dickey | 62/179 |
| 4,168,456 | 9/1979 | Isobe | 123/41.12 |
| 4,200,910 | 4/1980 | Hall | 165/22 |
| 4,475,485 | 10/1984 | Sakakibara et al. | 123/41.05 |

Primary Examiner—William A. Cuchlinski, Jr.
Attorney, Agent, or Firm—Harness, Dickey & Pierce

[57] ABSTRACT

The temperature controller employs a single thermistor temperature sensor providing an analog signal indicative of engine system temperature. The analog signal is compared with a plurality of separate threshold temperatures to produce a multiplicity of separate temperature signals representing different temperature ranges across the operating temperature spectrum of the engine system. These separate temperature signals are processed through digital logic gating circuitry to provide sequentially occurring outputs on parallel output leads. The sequentially occurring outputs sequentially activate different heat dissipating mechanisms within the engine system to maintain a substantially constant temperature.

12 Claims, 2 Drawing Figures

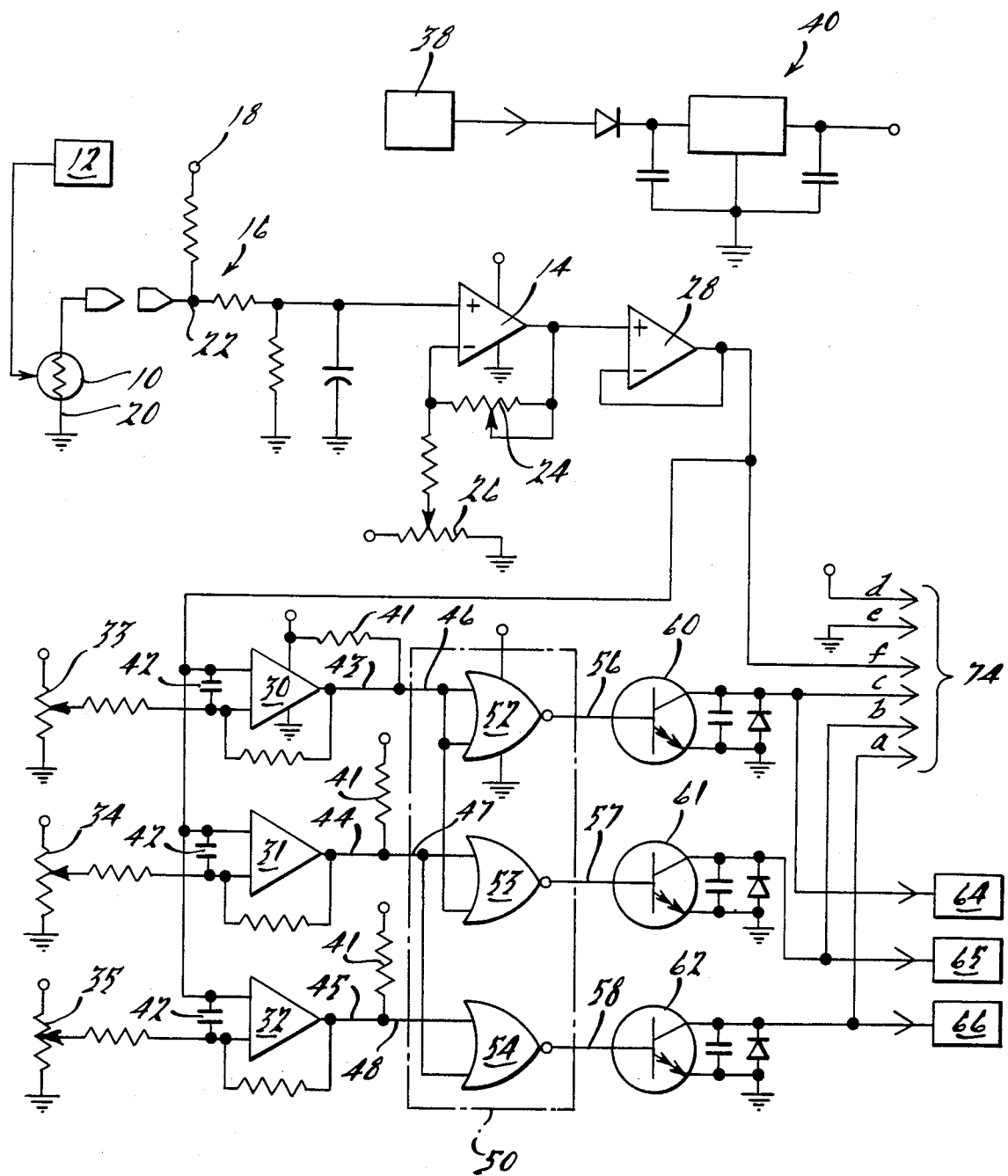

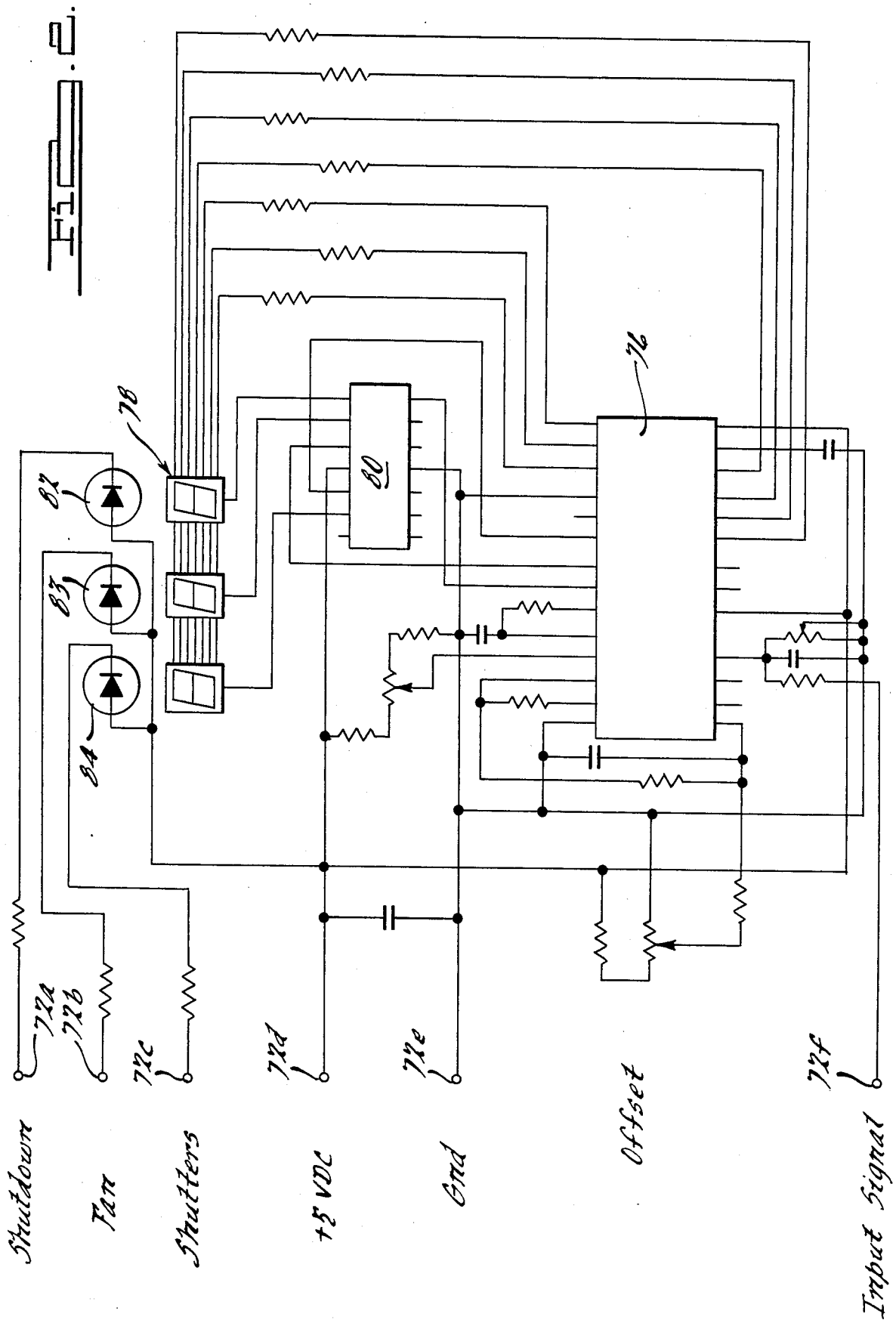

ELECTRONIC CONTROLLER FOR REGULATING TEMPERATURE WITHIN AN INTERNAL COMBUSTION ENGINE SYSTEM

BACKGROUND OF THE INVENTION

1. Field of the Invention

This invention relates generally to electronic temperature controllers, and more particularly to electronic temperature controllers for operating a plurality of temperature dissipating mechanisms within an internal combustion engine system.

2. Description of the Prior Art

It is well known that internal combustion engines operate more efficiently when the operating temperature of the system is held constant. In gasoline powered automotive engines, for example, mechanical thermostatic devices are often employed within the engine coolant system to regulate the flow of coolant through the engine system radiator and to maintain a relatively constant engine temperature. In diesel engines, particularly heavy duty diesel engines for semi-tractors and the like, the need to maintain a constant engine temperature is even greater than with gasoline automotive engines. Diesel engines operate at peak efficiency within a comparatively narrow temperature range, and efficiency falls sharply as the engine temperature deviates from this temperature range. Moreover, the engine can be permanently damaged if the operating temperature exceeds a predefined upper limit.

In order to maintain a constant engine temperature, for peak efficiency, prior art internal combustion engine systems have employed a variety of different heat dissipating mechanisms, either singly or in combination with one another. In a diesel engine system for use in heavy duty commercial trucking applications, it is accepted practice to employ a circulating coolant system having a radiator disposed in the front of the vehicle for cooling the circulating coolant. A shutter or adjustable louver system is disposed in front of the radiator to regulate the forced air flow as the vehicle is moving. Also, it is not uncommon to provide an over temperature warning system and/or engine shut down system for preventing engine damage when excessive temperatures are reached.

In some of the prior art temperature controlling systems using several such heat dissipative mechanisms, each heat dissipative mechanism is actuated by a dedicated thermostatic device used only to control that one mechanism. Such systems are quite costly since a plurality of temperature sensors or thermostatic devices must be used. Another prior art temperature controlling system uses a single thermostatic device which provides a temperature signal for comparison against a plurality of predetermined set point temperatures. Each of a plurality of heat dissipating mechanisms is actuated at its own unique set point temperature. In this fashion, one temperature sensor or thermostatic device is capable of independently controlling a plurality of separate heat dissipating mechanisms. As an example of this latter temperature controlling system, reference may be had to U.S. Pat. No. 3,568,648 to Cass, entitled Water Temperature Control For Diesel Engines, issued Mar. 9, 1971.

One problem with all prior art temperature controlling systems, whether based on a plurality of temperature sensors or on a single temperature sensor, is the inability to anticipate the engine system's cooling needs and to adapt the cooling system's performance to best suit the anticipated needs.

SUMMARY OF THE INVENTION

The present invention provides an electronic temperature controller that is capable of anticipating an internal combustion engine system's cooling needs, based upon physically measurable quantities indicative of the load placed upon the engine, or upon quantities indicative of the time rate of change in engine system temperature. The present invention provides a temperature controller which readily adapts to the engine system's cooling needs, on a real time basis, thereby making it possible to more closely maintain a constant engine temperature. The invention is capable of providing digital signals for controlling the heat dissipative mechanisms, the digital signals providing high resolution across the temperature spectrum whereby the temperature dissipative mechanisms can be accurately actuated at precise time intervals or in readily alterable relationship to one another. The precision afforded by the invention permits the temperature controlling system to control or modulate the temperature dissipation of the engine system with an accuracy never before achieved.

In accordance with the invention an electronic controller for regulating temperature within an internal combustion engine system having a plurality of electrically controllable temperature dissipating mechanisms is provided. The invention comprises a temperature sensing means for thermal coupling with the engine system and for providing a temperature indicating signal. The invention further comprises a means for providing a plurality of reference signals indicative of predetermined set point temperatures within the temperature spectrum over which the engine operates. A first means for determining a first relationship between the temperature indicating signal and one of the reference signals provides a first signal indicative of a first relationship. A second means for determining a second relationship between the temperature indicating signal and another of the reference signals provides a second signal indicative of a second relationship. Logic gating means, responsive to the first and second signals, provides a plurality of electrical digital output signals for controlling the temperature dissipating mechanisms. These output signals occur in controlled temporal relationship to one another, determined in accordance with the first and second signals. Preferably this temporal relationship defines a priority between the first and second signals.

For a further understanding of the invention, its objects and advantages, reference may be had to the following specification and to the accompanying drawings.

BRIEF DESCRIPTION OF THE DRAWINGS

FIG. 1 is a schematic diagram illustrating a first embodiment of the invention; and FIG. 2 is a schematic block diagram illustrating a digital visual read out circuit usable with the present invention.

DESCRIPTION OF THE PREFERRED EMBODIMENT

With reference to FIG. 1, a first embodiment of the invention is illustrated. The invention comprises thermistor 10 for thermal coupling to the internal combustion engine system denoted schematically by reference numeral 12. Thermistor 10 is coupled to the noninverting input of operational amplifier 14, via resistive divider network 16. Resistive divider network 16 is coupled to a source of regulated DC voltage as at node 18, while thermistor 10 is coupled to ground as at node 20. Temperature changes in engine system 12 are sensed by thermistor 10, which, in response to such temperature changes, changes its resistance to alter the voltage at node 22 of resistive divider network 16. These changes in voltage produce a signal indicative of engine system temperature. This temperature indicating signal is amplified by operational amplifier 14 at a gain determined in accordance with variable feedback resistor 24. The temperature indicating signal is adjusted to a predetermined average or DC level by means of offset adjusting resistor 26. The amplified and offset adjusted signal from operational amplifier 14 is processed through unity gain operational amplifier 28, for application to a plurality of comparators, such as comparators 30, 31, and 32.

Each of the comparators 30, 31, and 32 compares the temperature indicating signal from the output of operational amplifier 28 with a reference signal indicative of a predetermined set point temperature within the temperature spectrum of the operating engine system. These reference signals are provided by resistive divider potentiometers 33, 34, and 35, each being coupled between a DC potential and ground. This DC potential may be derived from the vehicle battery or alternator power source 38 utilizing conventional rectifying, filtering and voltage regulating circuitry 40. This same circuitry can be used to provide the DC voltage at node 18 in the resistive divider network 16. While potentiometer divider circuits are illustrated in FIG. 1, other equivalent reference voltage sources may be implemented. For example, potentiometers 33, 34 and 35 may be replaced with fixed or preset resistors on a plug-in module for coupling to the comparators 30, 31 and 32, and for coupling between the DC supply potential and ground. Such plug-in modules are particularly convenient since they can be precalibrated at the factory and supplied in different resistance combinations, for effecting different temperature controlling performances. In addition such preset resistance plug-in modules are more resistant to incorrect setting by those with insufficient technical skill to properly set potentiometer voltage dividers. Comparators 30, 31 and 32 are each provided with noise shunting capacitors 42 across the respective input terminals. These noise shunting capacitors block voltage transients caused by engine ignition, or by other electrical noise producing devices such as warning buzzers, or the like, often found in vehicles.

Each of the comparators 30, 31 and 32 provide an output signal, on leads 43, 44 and 45, respectively, to separate inputs 46, 47 and 48 of logic gating circuit 50. In the embodiment of FIG. 1 logic gating circuit 50 comprises NOR gates 52, 53 and 54. Logic gating circuit 50 may comprise other or different combinational logic gates, as well. Further, as those skilled in the art will recognize, the invention may also be implemented using a microprocessor to provide the logic gating circuit functions. A microprocessor may also be used to implement the comparator functions, as well.

The logic gating circuit illustrated in FIG. 1 responds to the signals on inputs 46, 47 and 48 by providing a plurality of output signals on output leads 56, 57 and 58. These output signals are provided in temporal relationship to one another, namely sequential relationship to one another in accordance with the particular combination of input signals. The output signals on leads 56, 57 and 58 are digital signals which are buffered through driver transistors 60, 61 and 62, for providing electrical signals to control the temperature dissipating mechanisms 64, 65 and 66.

The invention further provides a visual display circuit for providing a digital numeric indication of engine system temperature as well as a visual indication of the operative status of the each of the temperature dissipating mechanisms. With reference to FIG. 2, the electronic circuit for providing these visual indications is illustrated. The circuit includes a plurality of terminals 72a through 72f for connection to terminals 74a through 74f on the temperature controller circuit shown in FIG. 1. The visual indication circuit includes digital volt meter module 76, which may be implemented using a National Semi-Conductor ADD3701 monolithic DVM integrated circuit. DVM module 76 drives seven segment display 78 via driver 80 in the usual fashion. Module 76 receives analog signals applied at terminal 72f and provides a digital numeric readout or indication of the engine system temperature as measured by thermistor 10 and processed through operational amplifiers 14 and 28.

The invention further provides a plurality of light emitting diodes 82, 83 and 84 for providing a visual indication indicative of the operative status of each of the temperature dissipating mechanisms 64, 65 and 66. More specifically, light emitting diodes 82, 83 and 84 are coupled in common to the DC supply potential at terminal 72d, and individually coupled to terminals 72a, 72b and 72c, respectively. As each of the temperature dissipating mechanisms is energized or activated, the corresponding light emitting diode is illuminated to provide a mechanism operative status indication.

In operation, thermistor 10 is thermally coupled to the engine system and in response to changes in engine system temperature the resistance of thermistor 10 changes. Such changes in resistance effects changes in voltage at node 22, thereby providing an analog voltage signal indicative of engine system temperature. This analog signal is amplified and conditioned through operational amplifiers 14 and 28. If desired, the gain of operational amplifier 14 may be adjusted using variable feedback resistor 24, while the DC level of the analog signal may be adjusted using offset adjust resistor 26.

The analog signal is applied to each of the comparators 30, 31 and 32. These comparators compare the single analog temperature indicating signal with individually selected set point reference signals. The set point reference signals are individually selected using potentiometers 33, 34 and 35, or the like. By judiciously setting potentiometers 33, 34 and 35, comparators 30, 31 and 32 each provide an output signal when the analog temperature indicating signal reaches or exceeds the given set point reference signal. More specifically, each of the output leads, 43, 44 and 45 of the comparators are coupled through pull up resistors 41 to the positive supply potential. When the set point temperature is reached or exceeded by the analog temperature indicating signal, the output lead is pulled low. Input terminals 46, 47 and 48 of logic gating circuit 50 sense the signals on leads 43, 44 and 45, respectively and provide digital output signals on leads 56, 57 and 58. While logic gating circuit 50 may be configured in a variety of ways, the embodiment illustrated in FIG. 1 provides output signals on leads 56, 57 and 58 which are constrained to occur in sequential relationship to one another. More specifically, the output on lead 58 is constrained to occur only after the output on lead 57 has occurred. Similarly, the output on lead 57 is constrained to occur only after the output on lead 56 has occurred. These output signals control driver transistors or switching transistors 60, 61 and 62, which are in turn coupled to control heat dissipating mechanisms 64, 65 and 66. For example, heat dissipating mechanisms 64, 65 and 66 may be solenoid activated devices having their respective solenoid windings or coils coupled between a source of positive potential and the collectors of transistors 60, 61 and 62. In this fashion, when the transistors are driven into conduction, current will flow through the solenoid coil to actuate the heat dissipating mechanism.

While the invention has been described in its preferred embodiment, it is to be understood that the invention is capable of modification without departing from the true scope and spirit of the invention in its broader aspects.

We claim:

1. An electronic controller for regulating temperature within an internal combustion engine system having a plurality of electrically controllable temperature dissipating mechanisms, comprising:

temperature sensing means for thermal coupling with said engine system and for providing temperature indicating signal;

means for providing a plurality of reference signals;

first comparator means for determining a first relationship between said temperature indicating signal and one of said reference signals and for providing a first signal indicative of said first relationship;

second comparator means for determining a second relationship between said temperature indicating signal and another of said reference signals and for providing a second signal indicative of said second relationship;

logic gating means responsive to said first and second signals for providing first and second digital output signals for controlling said temperature dissipating mechanisms, said logic gating means comprising;

a first semiconductor gate responsive to said first signal; and a second semiconductor gate responsive to said first and second signals;

said first gate providing said first digital output signal when receptive of said first signal;

said second gate providing said second digital output signal when receptive of said first signal and said second signal simultaneously, said output signals thereby occurring in controlled temporal relationship to one another determined in accordance with said first and second signals.

2. The controller of claim 1 wherein said temporal relationship is a sequential relationship.

3. The controller of claim 1 wherein said second output signal is constrained by said first signal to occur after said first output signal.

4. The controller of claim 1 further comprising sensing means for determining a value indicative of the load upon said engine system and wherein said logic gating means is responsive to said sensing means.

5. The controller of claim 4 wherein said sensing means determines time rate of change in said temperature sensing means.

6. The controller of claim 5 wherein said sensing means determines time rate of change in said temperature indicating signal.

7. The controller of claim 1 wherein said temporal relationship defines a priority between said first and second signals.

8. The controller of claim 1 further comprising indicating means response to said output signals for indicating the operative status of at least one of said temperature dissipating mechanisms.

9. The controller of claim 1 further comprising temperature indicating means responsive to said temperature indicating signal for providing an indication of engine system temperature.

10. The controller of claim 9 wherein said indicating means provides digital numeric indication of engine system temperature.

11. The controller of claim 9 wherein said temperature sensing means provides an analog signal and said indicating means includes means for converting said analog signal to a digital signal.

12. The controller of claim 1 wherein said first gate has first and second input terminals both being connected together and coupled to receive said first signal; and wherein said second gate has a first input terminal coupled to receive said first signal and a second input terminal coupled to receive said second signal.

* * * * *